(12) United States Patent
Aher et al.

(10) Patent No.: US 11,782,984 B2
(45) Date of Patent: *Oct. 10, 2023

(54) STYLING A QUERY RESPONSE BASED ON A SUBJECT IDENTIFIED IN THE QUERY

(71) Applicant: Rovi Guides, Inc., San Jose, CA (US)

(72) Inventors: Ankur Anil Aher, Maharashtra (IN); Amith Joseph D'Souza, Bangalore (IN); Nishchit Mahajan, Punjab (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,857

(22) Filed: Jan. 12, 2022

(65) Prior Publication Data

US 2022/0138268 A1    May 5, 2022

Related U.S. Application Data

(63) Continuation of application No. 16/428,404, filed on May 31, 2019, now Pat. No. 11,256,753.

(51) Int. Cl.
| *G06F 16/9038* | (2019.01) |
| *G06F 16/9032* | (2019.01) |
| *G06F 16/9035* | (2019.01) |
| *G06F 16/908* | (2019.01) |
| *G06F 40/109* | (2020.01) |
| *G06F 40/279* | (2020.01) |
| *G06F 40/205* | (2020.01) |
| *G06F 16/783* | (2019.01) |

(52) U.S. Cl.
CPC .... *G06F 16/90332* (2019.01); *G06F 16/7844* (2019.01); *G06F 16/908* (2019.01); *G06F 16/9035* (2019.01); *G06F 16/9038* (2019.01); *G06F 40/109* (2020.01); *G06F 40/205* (2020.01); *G06F 40/279* (2020.01)

(58) Field of Classification Search
CPC ........... G06F 16/90332; G06F 16/9038; G06F 16/9035; G06F 16/908; G06F 40/109; G06F 40/279; G06F 40/205
See application file for complete search history.

(56) References Cited

U.S. PATENT DOCUMENTS

| 6,968,332 | B1 | 11/2005 | Milic-Frayling et al. |
| 9,767,169 | B1 | 9/2017 | Paff et al. |
| 2006/0047704 | A1* | 3/2006 | Gopalakrishnan ...... G06F 16/51 707/E17.031 |
| 2006/0064631 | A1 | 3/2006 | Parker |
| 2009/0019009 | A1* | 1/2009 | Byers ................. G06F 16/9535 |
| 2010/0114874 | A1* | 5/2010 | Hansson ............... G06F 16/951 707/E17.108 |
| 2010/0211561 | A1* | 8/2010 | Peterson ............. G06F 16/9038 707/E17.061 |
| 2013/0219269 | A1 | 8/2013 | Cranfill et al. |
| 2014/0046934 | A1 | 2/2014 | Zhou et al. |
| 2014/0149449 | A1 | 5/2014 | Bhola et al. |
| 2015/0161261 | A1 | 6/2015 | Griddaluru |
| 2016/0042082 | A1 | 2/2016 | Patel et al. |

OTHER PUBLICATIONS

PCT International Search Report for International Application No. PCT/US2020/035225, dated Sep. 16, 2020 (14 pages).

* cited by examiner

*Primary Examiner* — Sanchita Roy
(74) *Attorney, Agent, or Firm* — HALEY GUILIANO LLP

(57) ABSTRACT

User experience parameters are applied in formatting results to a query for presentation. The user experience parameters correspond to at least one particular subject related to the query.

20 Claims, 6 Drawing Sheets

I found several episodes of GAME OF THRONES available on TV

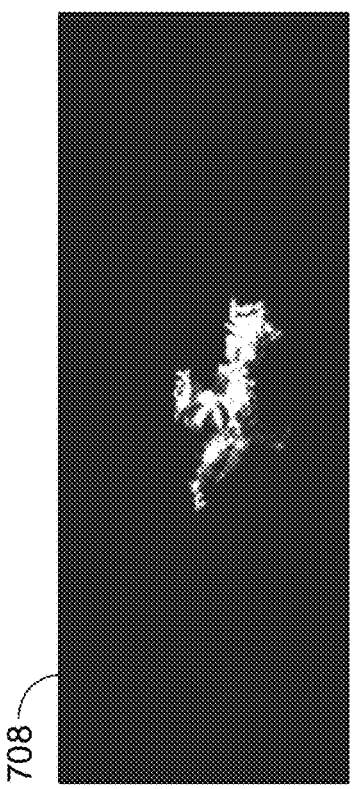
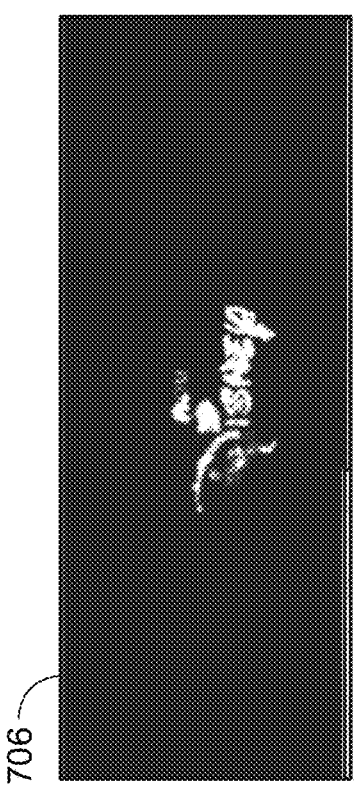
FIG. 7
HERE ARE SOME SCARY HORROR FLICKS: NIGHTMARE ON ELM STREET, HALLOWEEN FRIDAY THE 13TH
FIG. 8

STYLING A QUERY RESPONSE BASED ON A SUBJECT IDENTIFIED IN THE QUERY

CROSS-REFERENCE TO RELATED APPLICATION

This application is a continuation of U.S. patent application Ser. No. 16/428,404, filed May 31, 2019, the disclosure of which is hereby incorporated by reference herein in its entirety.

BACKGROUND

Responses to search queries are typically provided in a style that is not based on the search query. This results in a user experience that is less engaging.

SUMMARY

The present disclosure provides a method, a system, and a computer-readable medium with instructions programmed thereon for providing a response to a content query. This comprises receiving at a user device the query. The query is parsed to identify a subject of the query. One or more user experience parameters corresponding to the subject are retrieved from an electronic database. A textual result is based on the content query, wherein a portion of the textual result comprises at least one title. The textual result is formatted based on the user experience parameters and presented on a user device.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 shows an example of content associated with a subject that is used to generate a query result according to a user experience parameter in accordance with some embodiments of the present disclosure; and FIG. 8 shows an example of a query result that is formatted according to user experience parameters where the subject of the query is a genre.

DETAILED DESCRIPTION

The present disclosure is directed towards a content query system that processes content queries, also referred to herein as queries, to provide responses that are stylized in a manner corresponding to the query, the results thereto, or both.

Figure 1:
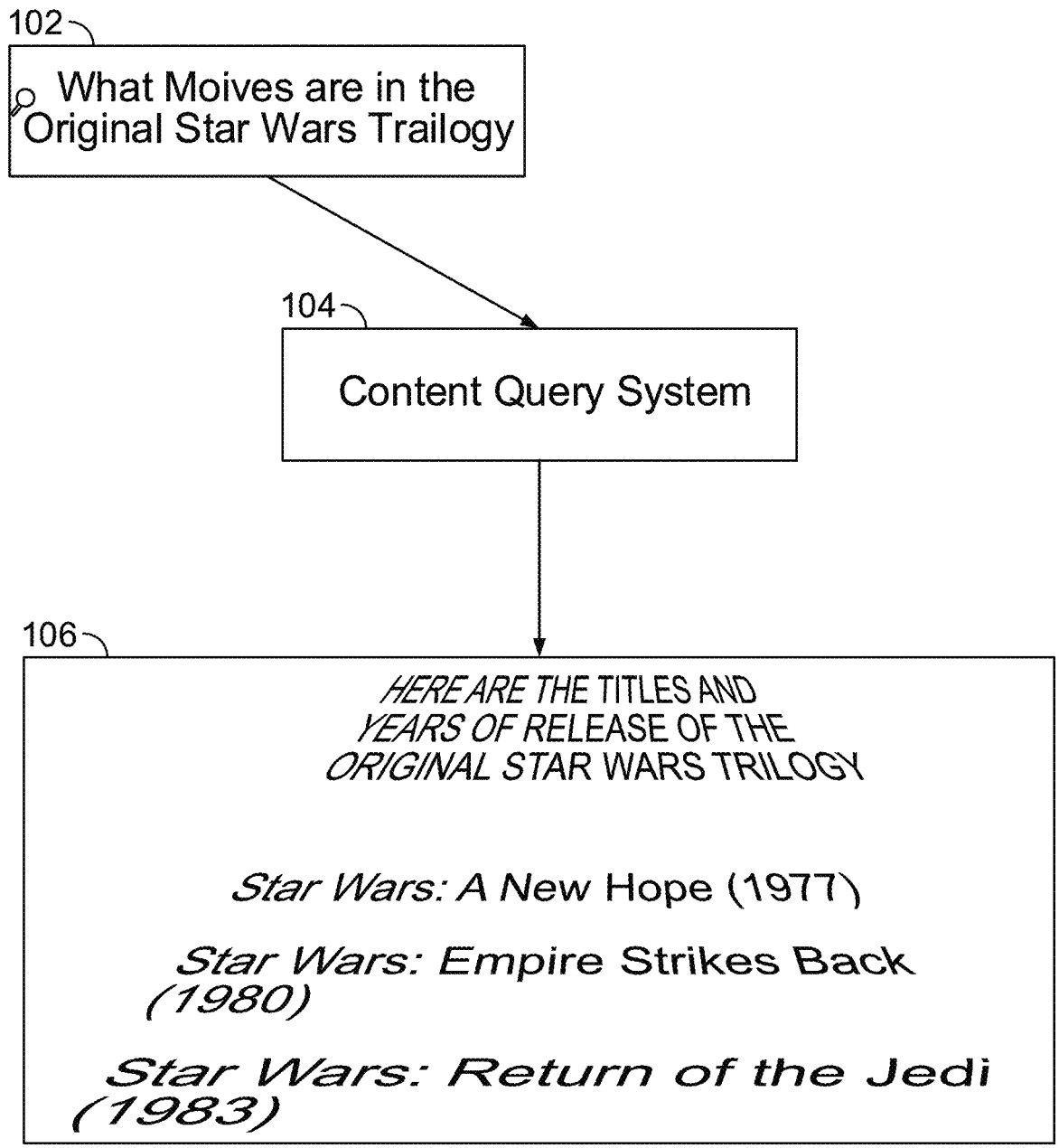
FIG. 1 shows a flow diagram of an illustrative process flow for processing a content query to generate an appropriately formatted result presentation in accordance with some embodiments of the present disclosure.

For example, as shown in FIG. 1, content query system 104 takes as input a query 102. Query 102 may have been entered by a user or otherwise generated by an application, such as a media guidance application, in response to a user interaction. Content query system 104 parses query 102 using any suitable parsing technique to identify one or more subjects of query 102. For example, as shown in FIG. 1, query 102 relates to the Star Wars film franchise and, more specifically, to the original Star Wars film trilogy. Content query system 104 identifies the Star Wars franchise as a subject of the query, generates the results for the query, and presents the query results 106 on a display screen using a stylization associated with the Star Wars franchise.

As shown, query results 106 are displayed according to a style associated with an opening sequence in the Star Wars film in which text is displayed on a starry space backdrop with the text scrolling from bottom to top in the manner displayed. Query results 106 may be displayed as a static image, as an animation, or both. For example, query results 106 may be presented in an animated manner in which the text scrolls in accordance with the style of the Star Wars opening scene. Query results 106 may be presented as a static image as shown in FIG. 1 or may be animated at certain times, such as when first presented, and then become a static image.

In some embodiments, query results 106 may include audio that content query system 104 has identified as being relevant to a subject of query 102. In the example of FIG. 1, music may be provided together with the simultaneous display of results 106. The music may be, for example, the music that is played during the corresponding opening scene of the Star Wars films.

These and other features and implementations thereof are discussed more fully in the description below.

Figure 2:
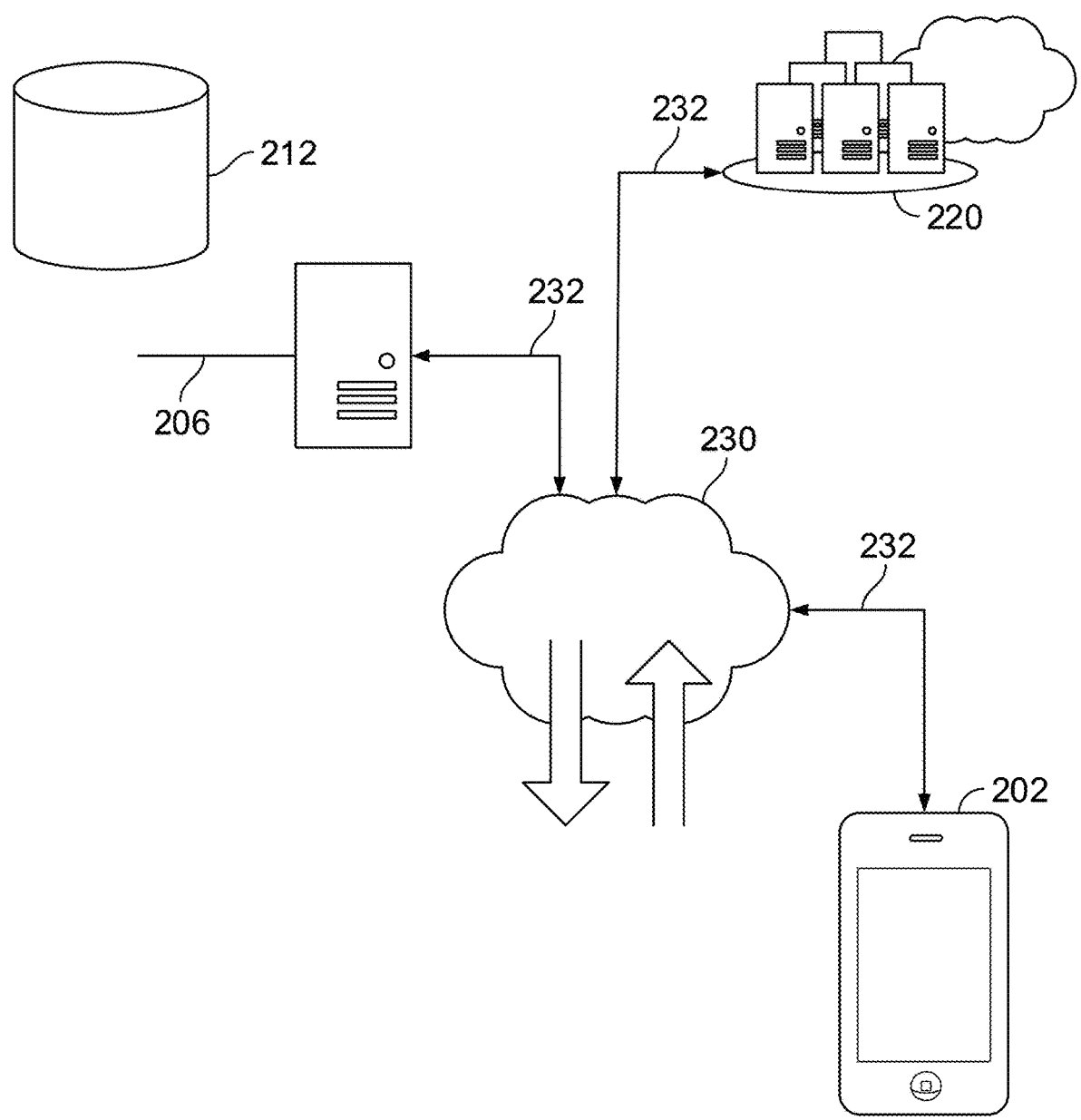
FIG. 2 shows an illustrative system for implementing the features and functions of the present disclosure in accordance with some embodiments of the present disclosure.

FIG. 2 shows an illustrative system for generating content query results. In particular, FIG. 2 shows a system 200, which may be or include, for example, content query system 104 of FIG. 1, where the user device 202 retrieves content query results, and/or the metadata related to the content query results, from the content source 206 via a communications path 232. The communications path 232 may be any network or communication equipment or medium by means of which the user device 202 can communicate with (e.g., submit a query to and/or retrieve data or content from) the content source 206. In one illustrative example, the communications path 232 includes devices connected via the Internet.

A search application may be implemented on any one or a combination of the user device 202, the content source 206, and/or an application server 220, each of which may function as a stand-alone device or may be part of a network of devices. Various network configurations of devices may be implemented and are discussed in more detail below. In the system 200, there may be multiple media devices 202, but only one is shown in FIG. 2 to avoid overcomplicating the drawing. In addition, multiple users may each utilize more than one type of user device 202 and also more than one of each type of user device 202, as described above. The search application may include any suitable software, hardware, or both for implementing the features and functions described herein with respect to receiving queries and performing all processes leading to query results being presented using appropriate user experience parameters.

The user device 202 may be coupled to a communication network 230. The communication network 230 may be one or more networks including the Internet, mobile phone network, mobile voice or data network (e.g., a 4G or LTE network), cable network, public switched telephone network, or other types of communication network or combinations of communication networks. The user device 202, the content source 206, and the application server 220 may be connected to the communication network 230 via one or more communications paths 232, such as a satellite path, a fiber-optic path, a cable path, a path that supports Internet communications (e.g., IP), a free-space connection (e.g., for wireless signals), and/or any other suitable wired or wireless communications path or combination of such paths.

Although communications paths 232 are not drawn directly between the user device 202 and the content source 206 or the application server 220, these devices may communicate directly with each other via communications paths 232, such as short-range point-to-point communications paths, for example USB cables, IEEE 1394 cables, wireless paths (e.g., BLUETOOTH, infrared, IEEE 802-11x, etc.), or other short-range communication via wired or wireless paths. BLUETOOTH is a certification mark owned by Bluetooth SIG, INC. The devices may also communicate with each other directly through an indirect path via the communication network 230.

The system 200 may include more than one content source 206, but only one is shown in FIG. 2 to avoid overcomplicating the drawing. As shown in FIG. 2, the content source 206 includes a database, a table, or any other suitable data structure, and/or any combination thereof (referred to hereinafter as database 212) storing a list of each content item on the content source 206, and/or data indicating other content items to which each stored content item is related, whether also stored therein or elsewhere. In some embodiments, content source 206 includes, for example, as part of database 212, any suitable indexing data for content items that may be used for purposes of generating results to content search queries. Content items may include, for example, media content items such as video-based items, audio-based items, static or animated image-based items, text-based items, web pages, any other suitable content item, any suitable link thereto, and any combination thereof. Indexing data for content items may include any suitable information that would enable the search application to perform a search for relevant content items.

Database 212 may also include any suitable metadata associated with each respective content item, including information about, for example, user experience parameters. User experience parameters may include any suitable data indicative of the stylization (also referred to herein interchangeably as formatting) associated with the parameters' respective content items. Such user experience parameters may include, without limitation, fonts, colors, sounds, any suitable animations of any suitable text, images, or both, text sizes, any other suitable parameter associated with a display format, or any combination thereof.

Content source 206 may also store any suitable data for use in allowing the search application to format results, including, for example, font files, animation files, images, formatting data, data related to specific subjects that may be used to generate metadata in accordance with the present disclosure, any other suitable formatting-related data, or any combination thereof.

The search application may be, for example, a stand-alone application implemented on the user device 202 described above. For example, the search application may be implemented as software or a set of executable instructions, which may be stored in storage 308 (described below with reference to FIG. 3) and executed by control circuitry 304 (described below with reference to FIG. 3) of the user device 202. In some embodiments, the search application is a client/server-based application where only a client application resides on the user device 202, and a server application resides on the application server 220. For example, a search application may be implemented partially as a client application on the control circuitry 304 of the user device 202 and partially on the application server 220 as a server application running on the control circuitry 304 of the application server 220. When executed by the control circuitry 304 of the application server 220, the search application may instruct the control circuitry 304 of the user device 202 to transmit query data to the application server 220, which then generates search results and transmits the search results, including search results that have been stylized according to corresponding user experience parameters, back to the user device 202.

In some embodiments, the search application may implement or be part of a smart search system such as a digital assistant that is able to parse and interpret natural language queries and comb through various resources that may be disparate and distinct from one another. The smart search system is able to synthesize results to the queries based on information extracted from these various sources in a concise and coherent manner.

While system 200 is shown in FIG. 2 as including only the user device 202, the content source 206, and the application server 220, those skilled in the art will appreciate that the system 200 may further include various other devices. In some embodiments, the user device 202 may operate in a cloud computing environment to access cloud services. In a cloud computing environment, various types of computing services for content sharing, storage, or distribution are provided by a collection of network-accessible computing and storage resources, referred to as "the cloud." The user device 202 may be a cloud client that relies on cloud computing for application delivery, or the user device 202 may have some functionality without access to cloud resources. For example, some applications running on the user device 202, such as the search application, may be cloud applications, that is, applications delivered as a service over the Internet, while other applications may be stored and run on the user device 202. In some embodiments, the user device 202 uses cloud resources for processing operations, such as the processing operations performed by the processing circuitry 306 described in relation to FIG. 3. For example, the user device 202 may rely on the application server 220 and/or another cloud resource to generate content query results.

Figure 3:
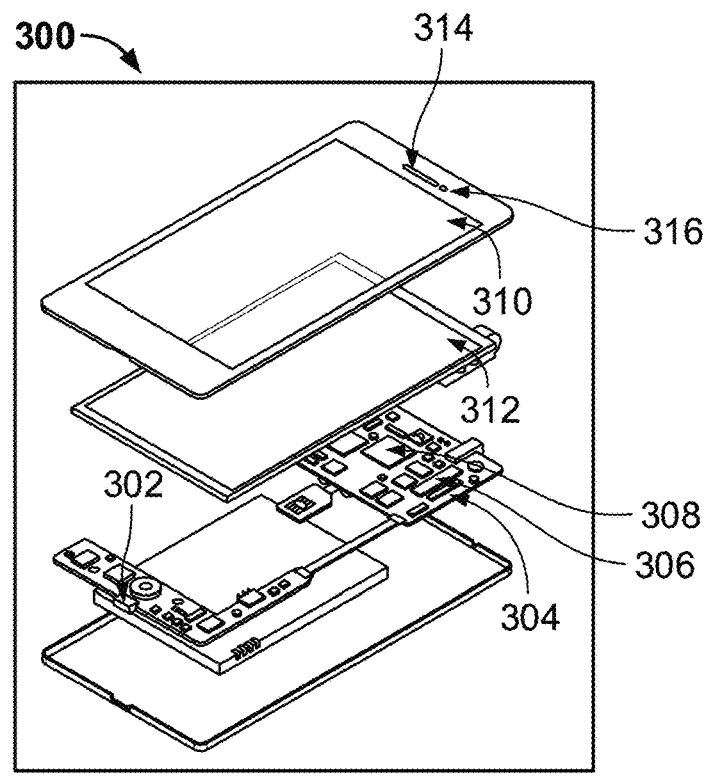
FIG. 3 shows an illustrative user device in accordance with some embodiments of the present disclosure.
Figure 3:
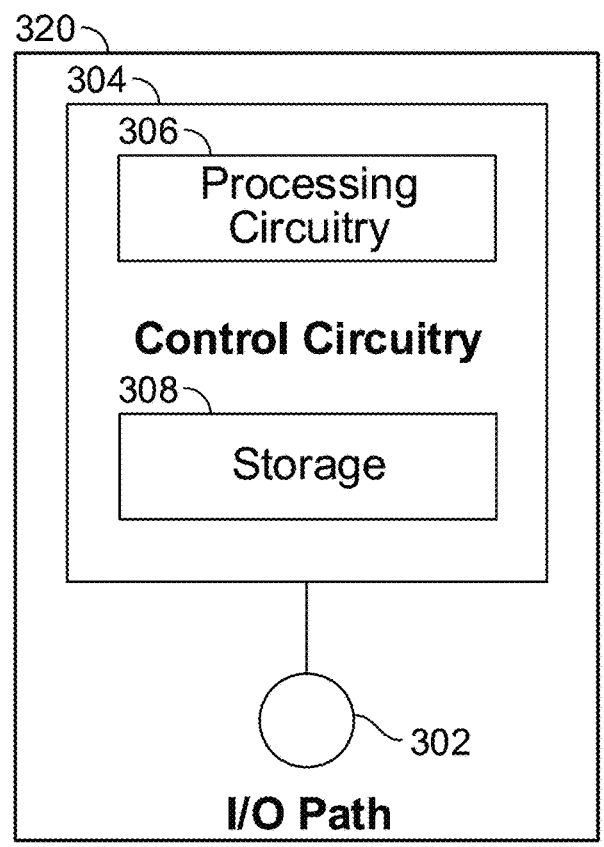

FIG. 3 shows a generalized embodiment of an illustrative user device 300. As depicted, the user device 300 may be a smartphone or tablet. The user device 300 may receive content and data via an input/output (hereinafter "I/O") path 302. The I/O path 302 may provide user input, user preferences, content queries, query results, and/or metadata related to any of the aforementioned to control circuitry 304, which includes processing circuitry 306 and storage 308. The control circuitry 304 may send and receive commands, requests, and other suitable data using the I/O path 302. The I/O path 302 may connect the control circuitry 304 (and specifically the processing circuitry 306) to one or more communications paths (described below). I/O functions may be provided by one or more of these communications paths, but a single path is shown in FIG. 3 to avoid overcomplicating the drawing.

The control circuitry 304 may be based on any suitable processing circuitry, such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, the control circuitry 304 executes instructions for a media content guide-generating application stored in memory (i.e., the storage 308). Specifically, the control circuitry 304 may be instructed by the search application to present search results in accordance with specific user experience parameters, and/or perform the other functions described above and below.

In client/server-based embodiments, the control circuitry 304 includes communications circuitry suitable for communicating with a search application server or other networks or servers. The instructions for carrying out the above-mentioned functionality may be stored on a server. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication networks or paths. In addition, the communications circuitry may include circuitry that enables peer-to-peer communication of user devices, or communication of user devices in locations remote from each other.

The memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, hard drives, optical drives, solid state devices, quantum storage devices, or any other suitable fixed or removable storage devices, and/or any combination of the same. Nonvolatile memory may also be used. Cloud-based storage, described in relation to FIG. 2, may be used to supplement the storage 308 or instead of the storage 308.

The circuitry described herein may execute instructions included in software running on one or more general purpose or specialized processors. Multiple circuits may be provided to handle simultaneous processing functions. If the storage 308 is provided as a separate device from the user device 300, the circuitry may be associated with the storage 308.

A user may send instructions to the control circuitry 304 using a user input interface 310 of the user device 300. The user input interface 310 may be any suitable user interface, such as a remote control, mouse, trackball, keypad, keyboard, touchscreen, touchpad, stylus input, joystick, or other user input interfaces. Display 312 may be a touchscreen or touch-sensitive display. In such circumstances, user input interface 310 may be integrated with or combined with the display 312. A camera, microphone, or other visual or voice recognition interface may also be used to receive user input. Speakers 314 may be provided as integrated with other elements of the user device 300.

The search application may be implemented using any suitable architecture. For example, it may be a stand-alone application wholly implemented on the user device 300. The search application and/or any instructions for performing any of the embodiments discussed herein may be encoded on computer-readable media. Computer-readable media include any media capable of having computer-executable instructions encoded thereon that, when executed by a processor, cause a device, such as user device 300, to perform the instructed operations. In some embodiments, the search application is a client/server-based application. Data for use by a thick or thin client implemented on the user device 300 are retrieved on demand by issuing requests to a server remote from the user device 300, as described above.

Figure 4:
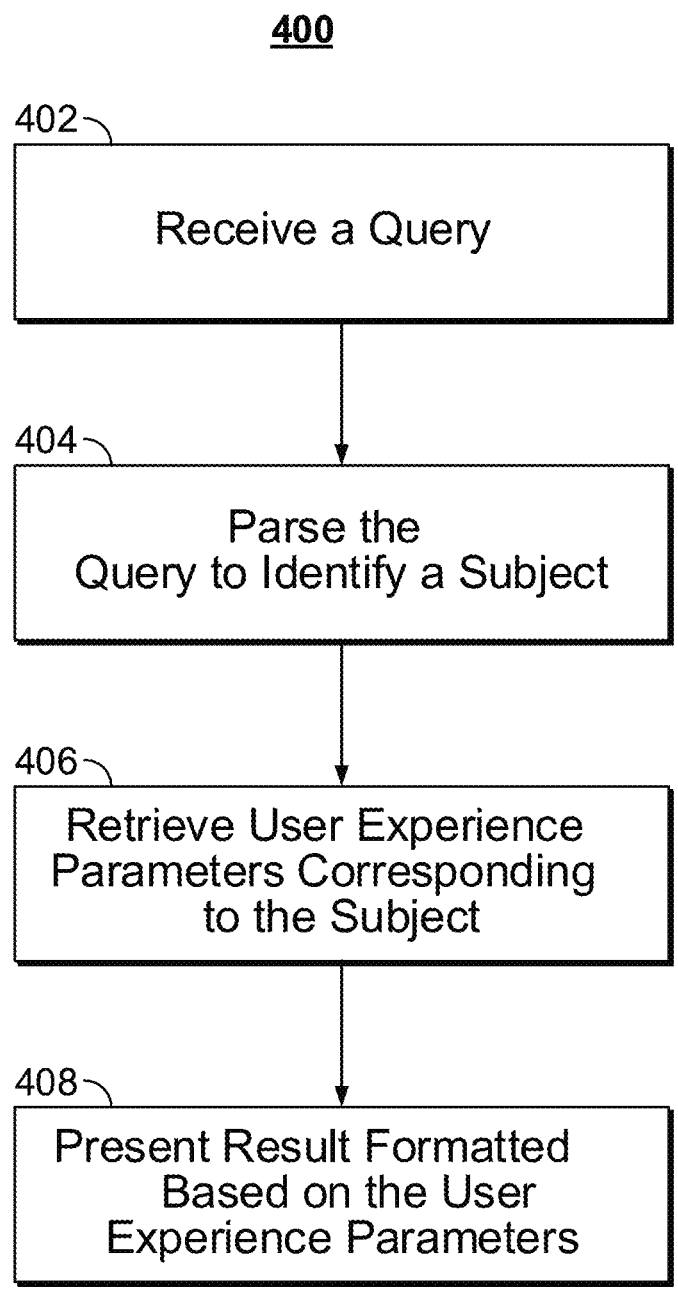
FIG. 4 shows a flow diagram of illustrative steps involved in generating appropriately formatted query results in accordance with some embodiments of the present disclosure.

FIG. 4 shows a flowchart 400 of illustrative steps for presenting a response to a query in accordance with some embodiments of the present disclosure. At step 402, the search application receives a query. For example, the search application may take as input a query using, for example, user device 300 or 202. In one suitable approach, the query may be entered by a user (e.g., by way of a keyboard, voice recognition, or any other suitable input mechanism that allows the user to explicitly define the query). In another suitable approach, the query may be at least in part automatically generated by the search application or any other suitable application at least partially implemented on the user device (e.g., upon a predefined trigger event occurring, through any suitable machine learning technique that determines that a user might be desirous of obtaining the queried information, using any other suitable mechanism, or any combination thereof).

The query may be related to any one or more subjects, such as specific media content, such as films, television, music, art, writings, genres, actors, media content providers, media content schedules, any other suitable media content-related subject, or any combination thereof It will be understood that subjects of a query are not limited to those related to media content, but the present disclosure is discussed primarily in terms of media content for purposes of brevity and clarity. Other subject may include, for example, people, places, and events that are not necessarily related to media content.

At step 404, the search application parses the query to identify at least one subject of the query. Any suitable technique may be used in parsing the query to identify a subject. For example, the search application may employ any one or more of analysis of words, phrases, and combinations thereof, syntactical analysis, preferences and any other suitable information associated with the user, any other suitable parsing technique, or any combination thereof. While the search application may identify more than one subject in a given query, in some embodiments, the search application may select only one of the identified subjects for purposes of formatting the query results. The search application may make this selection, for example, based on any suitable criteria, such as a scope of the subject (e.g., a genre identified as a subject may take priority over a specific film), the popularity of the subjects in which each identified subject may be ranked, with the selected subject having the highest popularity as defined by any suitable scale, according to a predefined hierarchy (e.g., a program or movie title takes priority over an actor name). In some embodiments, the search application may select more than a single one of the identified subjects to use in formatting the query results as discussed below.

At step 406, the search application retrieves user experience parameters that correspond to the identified subject. In some embodiments, the search application retrieves user experience parameters from a database of subjects that are each associated or capable of being associated with respective metadata. For example, the search application may access database 212 of FIG. 2. In such embodiments, the metadata may include user experience parameters. In some approaches, the database may include data, for example within the metadata, indicative of where to obtain certain files to implement particular formatting, such as font files, animation files, audio files, any other suitable files or any combination thereof.

In some embodiments, the metadata may include data indicative of where such files or any other additional formatting information may be obtained, such as URL information, IP addresses, any other suitable pointers to relevant formatting information, or any combination thereof. All or some of the data may be stored, for example, in content source 206, in the user device, in any other suitable location, or any combination thereof. Step 406, therefore, provides for the search application retrieving not only user experience parameters associated with a particular subject, but also any additional data needed for implementing the relevant formatting, such as font files.

In some embodiments, when the database of metadata, such as database 212 of FIG. 2, does not contain user experience parameters, the search application may generate user experience parameters. For example, the search application may access any suitable content indicative or otherwise representative of user experience parameters for a particular subject. In the case of a media content item, the user application may access any suitable related content that exhibits the user experience parameters that would likely be associated with the subject. For example, where the subject is a film, the search application may analyze images associated with the film, such as promotional content, program trailers, program opening credits video frames, program closing credits video frames, any other suitable image, or any combination thereof.

The search application may employ any suitable analysis to generate user experience parameters. For example, the search application may identify user experience parameters such as fonts using machine learning by identifying characters in the analyzed content and applying suitable neural networks and classifiers, any other suitable machine learning constructs, or any combination thereof. In this way, the search application may identify a font used in connection with the subject. Once identified, the search application may locate and access the identified font from any suitable database, including fonts stored locally at the user device. In some embodiments, the search application may generate a font file based on, for example, the machine learning analysis or any other suitable analysis. It will be understood that other user experience parameters, such as text animation, may be identified and generated using machine learning or other such suitable techniques.

At step 408, the search application generates and presents results that are formatted based on the retrieved user experience parameters. For example, the search application may display text-based results on the user device in which the text-based results are formatted according to the user experience parameters. In some embodiments, the search application may format only a portion of the text-based results. For example, where the results include titles of media content items such as film titles or television program titles, the search application may format only the titles according to the user experience parameters. In some embodiments, all of the text-based results may be formatted according to the user experience parameters. In one suitable approach, the search application may format only a portion of the text-based results when user experience parameters can be applied only to that portion and not the remaining portion. For example, when the user experience parameters for the identified subject identify a font that is available only for a limited number of characters, then, for example, the search application formats only words in the results that can be entirely formatted according to the identified font.

In some embodiments, when the search application identifies more than one subject in the query, more than one set of user experience parameters may be used to format the results provided. In this case, in some suitable approaches, the search application may apply the different user experience parameters to respective results. For example, if a query is "movies with Harrison Ford," then the search application identifies Indiana Jones and Star Wars as subjects and may include in its results titles such as "Indiana Jones" and "Star Wars" that are each formatted according to their respective subject user experience parameters.

When the query is related to finding content or information about content, the search application will typically indicate the relevant titles in the query results as displayed. The search application may generate and cause to be displayed other text in addition to content titles. For example, introductory text may be displayed, information about the titles that the search application deems relevant to the query may be displayed, any other suitable textual information may be displayed, or any combination thereof. It will be understood that the search application will apply formatting to some or all of the text displayed as described herein. While the search application is capable of distinguishing between text corresponding to titles versus text not corresponding to titles, the features of this disclosure are not limited to being applied to only one or the other.

Figures 5, 6:
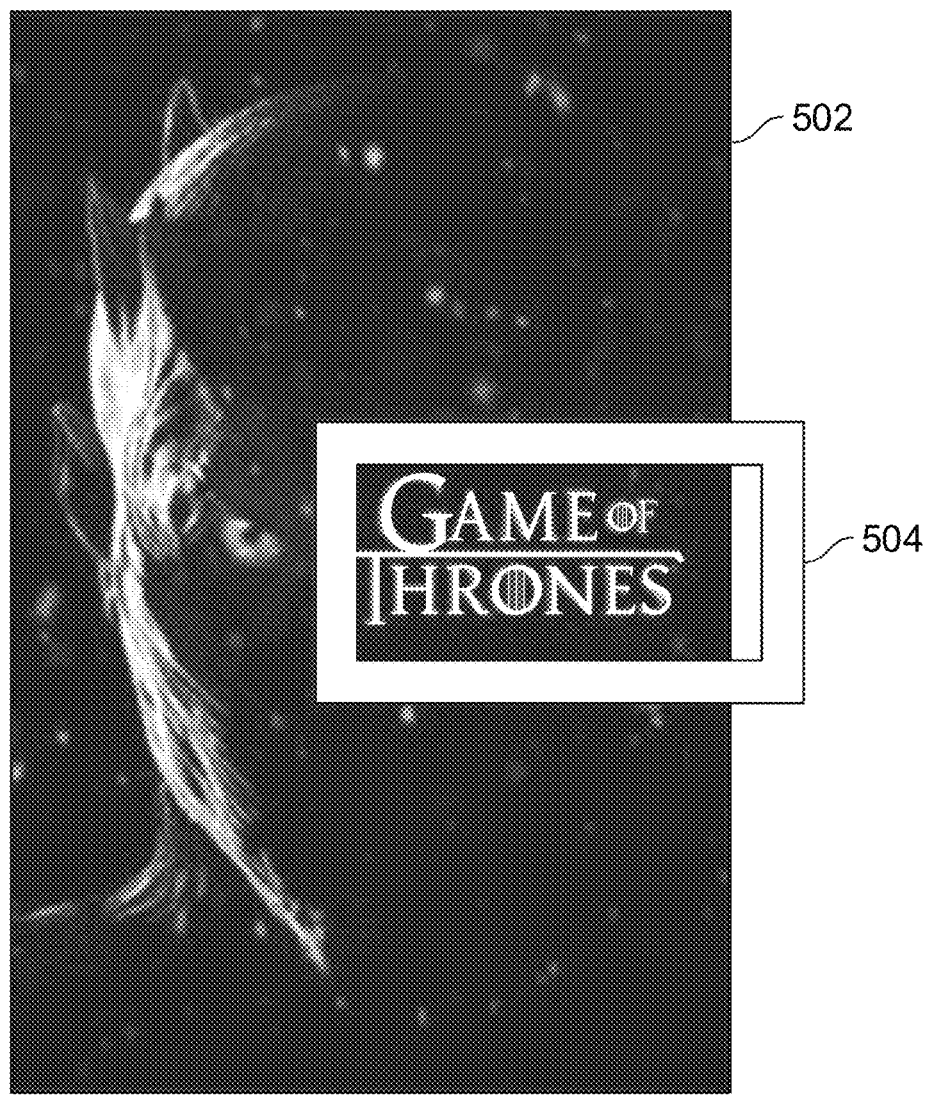
FIG. 5 shows an example of content associated with a subject that is used to generate a user experience parameter in accordance with some embodiments of the present disclosure.
FIG. 6 shows an example of a query result that is formatted according to the user experience parameter generated with respect to FIG. 5.

FIGS. 5-8 illustrate examples of how the search application of the present disclosure may be used to format query results in accordance with the present disclosure. FIGS. 5 and 6 relate to a query such as "Are Game of Thrones episodes available?" The search application parses this query to identify that the television program, Game of Thrones, is the subject of the query. The search application may access metadata associated with Game of Thrones, such as at database 212, to retrieve user experience parameters associated with Game of Thrones.

The user experience parameters may have been generated from processing of a digital promotional image such as image 502. This may have been done previously in response to a previous query in which the subject was Game of Thrones, may have been predefined, or may be done in response to the current query (e.g., when no user experience parameters are currently available). The search application processes image 502 using any suitable technique such as described previously herein to identify text 504 and the format thereof. The search application identifies the font of text 504 and stores the font information in metadata associated with Game of Thrones. The user experience parameter metadata may take the following form or any other suitable form:

Id: 123456
Title: Game of Thrones
Font info:
   Phrase: Game of Thrones
   Font style: got.ttf
   Font size: 18

Phrase: GOT
Font style: got.ttf
Font size: 12

As shown, this user experience parameter metadata specifies different user experience parameters for different phrases in the context of the same subject. In this example, the metadata provides user experience parameters (in the form of fonts) to the phrases "Game of Thrones" and "GOT." The difference, in this example, is with respect to the respective font sizes in which "Game of Thrones" has a font size of 18 while "GOT" has a font size of "12." In some embodiments, the metadata may include default user experience parameters that would apply to all other phrases and text not specifically accounted for. This may be indicated as follows or in any other suitable way for fonts:
Phrase: <DEFAULT>
Font style: got.ttf
Font size: 10

In generating the response to the query, the search application generates a textual result 602 as shown in FIG. 6. Here, the search application generates a textual message saying "I found several episodes of Game of Thrones available on TV." The search application identified the font got.ttf as being associated with phrases "Game of Thrones" and "GOT" and has formatted phrase 604 corresponding to "Game of Thrones" using the identified font. In some embodiments, the search application may format all of the text of result 602 using the identified font, for example where the font is available for all displayed characters and where the corresponding metadata accounts for the formatting of other phrases and text. In some embodiments, the metadata may provide only a single set of user experience parameters that the search application applies to all text (i.e., not just defined phrases) consistently when generating results for presentation.

As another example, with reference to FIG. 1, the search application accesses user experience parameters in metadata associated with the subject Star Wars. The metadata may take the following form:
Id: 234567
Franchise: Star Wars
Font info:
   Phrase: <DEFAULT>
   Font style: starwars.ttf
   Font size: 14
   Font color: #FFFF00
Background info: StarWarsBG.jpg
Text Animation: StarWarsScroll.eft
Audio: StarWarsOpeningScroll.mp3

In this example, the subject is for the Star Wars franchise. There is a font that is specified to be used for all text in the results (i.e., starwars.ttf) having a font size of 14 and a font color yellow (corresponding to RGB #FFFF00). In addition, the user experience parameters include a background image, StarWarsBG.jpg, which provides a background on which the textual results are displayed. The user experience parameters further specify text display animation information by way of text effect StarWarsScroll.eft, which, when executed by the search application, causes the displayed text to be animated by scrolling the lines of text from the bottom to the top of the display with the perspective that the text is moving into the screen. The user experience parameters further include audio information in which the audio contained in StarWarsOpeningScroll.mp3 is to be played simultaneously with the display of the formatted textual results.

Any suitable text animation may be used as a user experience parameter. For example, the search application may identify the animation illustrated by video frames 702, 704, 706, and 708 of FIG. 7 in which the text turns to sand as being related to the subject of Disney's Aladdin. The search application may identify this animation in a trailer for Disney's film, Aladdin, and extract this particular animation to use for the phrase "Disney" as shown when returned as part of a result for a query in which the subject is Disney's film, Aladdin. In some embodiments, the search application may use any suitable technique, including any suitable machine learning technique, as discussed previously to generate an animation effect that can be applied to any or all of the text of a textual result provided by the search application for the relevant subject. For example, the following may be the metadata specifying the user experience parameter for Disney's Aladdin:
Id: 554433
Title: Aladdin
Font info:
   Phrase: Aladdin
   Font animation: Text_to_sand.avi
   Phrase: Disney
   Font animation: Text_to_sand.avi In this example, both terms "Disney" and "Aladdin" will have the illustrated animation applied by the search application when they appear in the textual results.

FIG. 8 shows an example of a textual result to a query that asks, "What are some good horror movies?" The search application identifies the subject of the query as being the horror genre. The search application accesses the metadata associated with the horror genre, which contains user experience parameters defining the font of all textual results to be a specific font and size as illustrated. It will be understood that this example is merely illustrative. For example, while the search application identifies the horror genre as the subject, in some embodiments, the search application may identify any one or more of the resultant films as subjects of the query. That is, the results may be used to define the subject in addition to or in place of the query itself.

The foregoing is merely illustrative of the principles of this disclosure, and it will be understood by those skilled in the art that various modifications may be made without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method comprising:
receiving a search query that is related to a video;
generating a plurality of search results based on the search query;
in response to determining that the search query is related to the video, selecting a text style, wherein the video comprises a frame that includes text formatted according to the text style; and
generating for display each of the plurality of search results formatted in the selected text style.

2. The method of claim 1, wherein each of the plurality of search results comprises a title of the video formatted in the selected text style.

3. The method of claim 1, further comprising:
determining a font identified by the text style,
wherein generating for display the plurality of search results formatted in the selected text style comprises generating for display at least a portion of text of each of the plurality of search results in the identified font.

4. The method of claim 3, wherein determining the font identified by the text style is performed based on accessing metadata of the video.

5. The method of claim 1, further comprising:
determining a text display animation identified by the text style,
wherein generating for display each of the plurality of search results formatted in the selected text style comprises generating for display at least a portion of each of the plurality of search results based on the text display animation.

6. The method of claim 1, further comprising:
accessing audio information, wherein the audio information specifies audio that is played during a frame of the video, and
causing the audio to be played while displaying the plurality of search results.

7. The method of claim 1, wherein the frame corresponds to:
a frame included in a trailer for the video;
an opening credits frame of the video; or
a closing credits frame of the video.

8. A system comprising:
memory circuitry;
input/output (I/O) circuitry configured to:
receive a search query that is related to a video;
control circuitry configured to:
generate a plurality of search results based on the search query;
in response to determining that the search query is related to the video, select a text style, wherein the video comprises a frame that includes text formatted according to the text style, wherein the text style is stored in the memory circuitry; and
generate for display each of the plurality of search results formatted in the selected text style.

9. The system of claim 8, wherein each of the plurality of search results comprises a title of the video formatted in the selected text style.

10. The system of claim 8, wherein the control circuitry is further configured to:
determine a font identified by the text style; and
generate for display the plurality of search results formatted in the selected text style by generating for display at least a portion of text of each of the plurality of search results in the identified font.

11. The system of claim 10, wherein the control circuitry is further configured to determine the font identified by the text style by accessing metadata of the video.

12. The system of claim 8, wherein the control circuitry is further configured to:
determine a text display animation identified by the text style, and
generate for display each of the plurality of search results formatted in the selected text style by generating for display at least a portion of each of the plurality of search results based on the text display animation.

13. The system of claim 8, wherein the control circuitry is further configured to:
access audio information, the audio information specifying audio that is played during a frame of the video, and
cause the audio to be played while displaying the plurality of search results.

14. The system of claim 8, wherein the frame corresponds to:
a frame included in a trailer for the video;
an opening credits frame of the video; or
a closing credits frame of the video.

15. A non-transitory computer-readable medium having computer-readable instructions encoded thereon that, when executed by control circuitry, causes the control circuitry to:
receive a search query that is related to a video;
generate a plurality of search results based on the search query;
in response to determining that the search query is related to the video, select a text style, wherein the video comprises a frame that includes text formatted according to the text style; and
generate for display each of the plurality of search results formatted in the selected text style.

16. The non-transitory computer-readable medium of claim 15, wherein each of the plurality of search results comprises a title of the video formatted in the selected text style.

17. The non-transitory computer-readable medium of claim 15, wherein the execution of the instructions further causes the control circuitry to:
determine a font identified by the text style, and
generate for display the plurality of search results formatted in the selected text style by generating for display at least a portion of text each of the plurality of search results in the identified font.

18. The non-transitory computer-readable medium of claim 17, wherein the execution of the instructions further causes the control circuitry to determine the font identified by the text style by accessing metadata of the video.

19. The non-transitory computer-readable medium of claim 15, wherein the execution of the instructions further causes the control circuitry to:
determine a text display animation identified by the text style, and
generate for display each of the plurality of search results formatted in the selected text style by generating for display at least a portion of each of the plurality of search results based on the text display animation.

20. The non-transitory computer-readable medium of claim 15, wherein the execution of the instructions further causes the control circuitry to:
access audio information, the audio information specifying audio that is played during a frame the video, and
cause the audio to be played while displaying the plurality of search results.

* * * * *